(12) United States Patent　　(10) Patent No.:　US 12,563,038 B2
White et al.　　　　　　　　　　(45) Date of Patent:　　Feb. 24, 2026

(54) TRANSPARENT, ON-DEMAND ROUTE DETERMINATION AND DELEGATED AUTHORIZATION IN A LARGE-SCALE, DECENTRALIZED SERVICE MESH

(71) Applicant: Dell Products, L.P., Round Rock, TX (US)

(72) Inventors: Alan White, Glasgow (GB); Brian Rochford, Ovens (IE); John Mcaleer, Waterfall (IE); Shashank Holakkal, Justin, TX (US); Helen Walsh, Cork (IE)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 18/516,628

(22) Filed: Nov. 21, 2023

(65) Prior Publication Data

US 2025/0168163 A1　　May 22, 2025

(51) Int. Cl.
　　*H04L 9/40*　　　　　(2022.01)
　　*H04L 45/00*　　　　(2022.01)
(52) U.S. Cl.
　　CPC ........ *H04L 63/0876* (2013.01); *H04L 45/566* (2013.01); *H04L 63/20* (2013.01)
(58) Field of Classification Search
　　CPC . H04L 63/0876; H04L 63/20; H04L 63/0807; H04L 45/566
　　See application file for complete search history.

(56) References Cited

U.S. PATENT DOCUMENTS

| | | | |
|---|---|---|---|
| 11,108,828 B1 * | 8/2021 | Curtis | ................... H04L 63/104 |
| 12,170,696 B2 * | 12/2024 | Curtis | ................. H04L 63/0263 |
| 2009/0216875 A1 | 8/2009 | Shi | |
| 2013/0031356 A1 | 1/2013 | Prince et al. | |

(Continued)

OTHER PUBLICATIONS

Harrenstien et al. "DOD Internet Host Table Specification" RFC 952, [https://datatracker.ietf.org/doc/html/rfc952] Oct. 1985, 6 pages.

(Continued)

*Primary Examiner* — Khoi V Le
(74) *Attorney, Agent, or Firm* — Amin, Turocy & Watson, LLP

(57)　　　　　ABSTRACT

A system can execute a containerized application that comprises a microservice in a decentralized service mesh architecture, and a sidecar. The system can intercept, by the containerized application, a call from the microservice that is directed to a remote endpoint, and direct the call to the sidecar. The system can communicate, by the sidecar to an identity manager, service account credentials associated with the microservice, resulting in receiving an identity token associated with the microservice. The system can determine, by the sidecar, connectivity information of the remote endpoint based on a virtual address of the remote endpoint identified in the call. The system can communicate, by the sidecar to a token exchanger, the identity token and the connectivity information, resulting in receiving an access token and a network route to the remote endpoint. The system can relay, by the sidecar, network traffic between the microservice and the remote endpoint.

20 Claims, 11 Drawing Sheets

(56) References Cited

U.S. PATENT DOCUMENTS

2016/0315919 A1    10/2016  Martini
2019/0303541 A1*  10/2019  Reddy ..................... G06F 21/64

OTHER PUBLICATIONS

P. Mockapetris. "Domain Names—Concepts and Facilities" RFC 1034, [https://datatracker.ietf.org/doc/html/rfc1034] Nov. 1987, 55 pages.
"DNS Proxying" Istio. [https://istio.io/latest/docs/ops/configuration/traffic-management/dns-proxy/] retrieved Apr. 11, 2025, 9 pages.
"Auto allocate ips based on hashing #42624" istio/istio. [https://github.com/istio/istio/pull/42624/files] retrieved Apr. 11, 2025, 9 pages.
White et al. "Initiating Transmission Control Protocol Connections to Non-Routable Remote Endpoints Within a Decentralized Service Mesh" U.S. Appl. No. 18/672,996, filed May 23, 2024, 43 pages.
Rochford, et al. "Transparent, On-Demand Route Determination and Delegated Authorization in a Large-Scale, Decentralized Service Mesh" U.S. Appl. No. 18/981,405, filed Dec. 13, 2024, 46 pages.
Rochford, et al. "Protection from Unwanted Behavior in Remote Appliances in a Decentralized Service Mesh" U.S. Appl. No. 19/023,245, filed Jan. 15, 2025, 43 pages.
"Linux Intrusion Detection System" Wikipedia. [https://en.wikipedia.org/wiki/Linux_Intrusion_Detection_System] retrieved Sep. 18, 2025, 2 pages.
Office Action mailed Oct. 28, 2025 for U.S. Appl. No. 18/672,996, 50 pages.

* cited by examiner

200
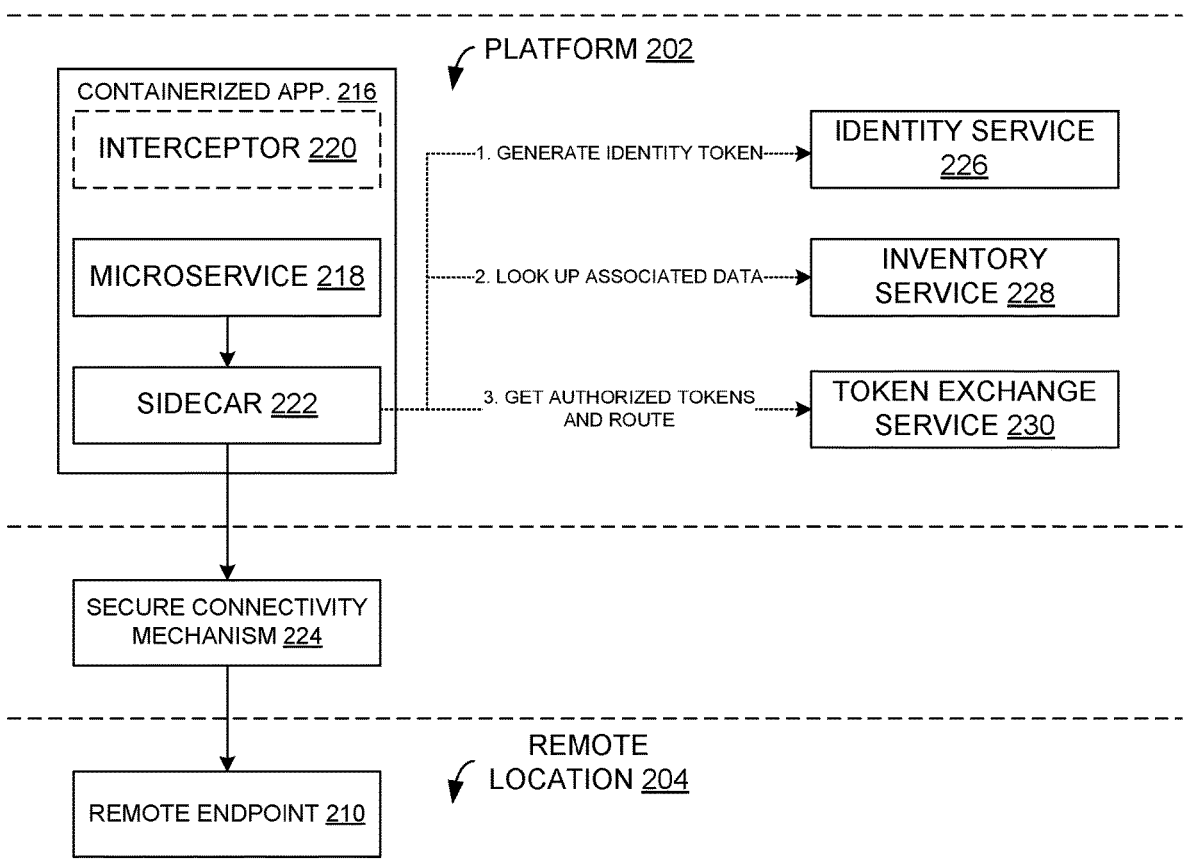
PLATFORM 202
CONTAINERIZED APP. 216
INTERCEPTOR 220
MICROSERVICE 218
SIDECAR 222
1. GENERATE IDENTITY TOKEN
IDENTITY SERVICE 226
2. LOOK UP ASSOCIATED DATA
INVENTORY SERVICE 228
3. GET AUTHORIZED TOKENS AND ROUTE
TOKEN EXCHANGE SERVICE 230
SECURE CONNECTIVITY MECHANISM 224
REMOTE LOCATION 204
REMOTE ENDPOINT 210
FIG. 2

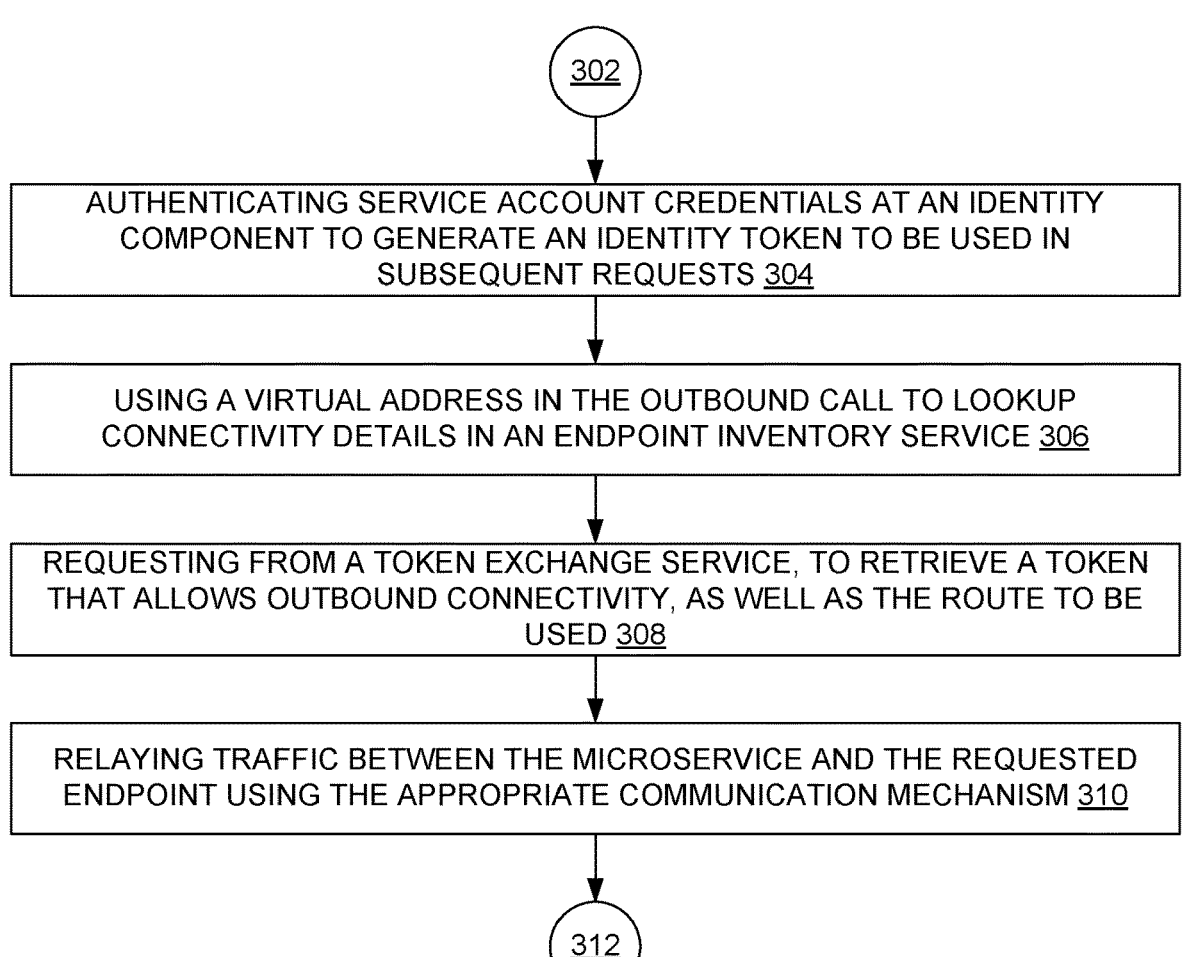

300

302

AUTHENTICATING SERVICE ACCOUNT CREDENTIALS AT AN IDENTITY COMPONENT TO GENERATE AN IDENTITY TOKEN TO BE USED IN SUBSEQUENT REQUESTS 304

USING A VIRTUAL ADDRESS IN THE OUTBOUND CALL TO LOOKUP CONNECTIVITY DETAILS IN AN ENDPOINT INVENTORY SERVICE 306

REQUESTING FROM A TOKEN EXCHANGE SERVICE, TO RETRIEVE A TOKEN THAT ALLOWS OUTBOUND CONNECTIVITY, AS WELL AS THE ROUTE TO BE USED 308

RELAYING TRAFFIC BETWEEN THE MICROSERVICE AND THE REQUESTED ENDPOINT USING THE APPROPRIATE COMMUNICATION MECHANISM 310

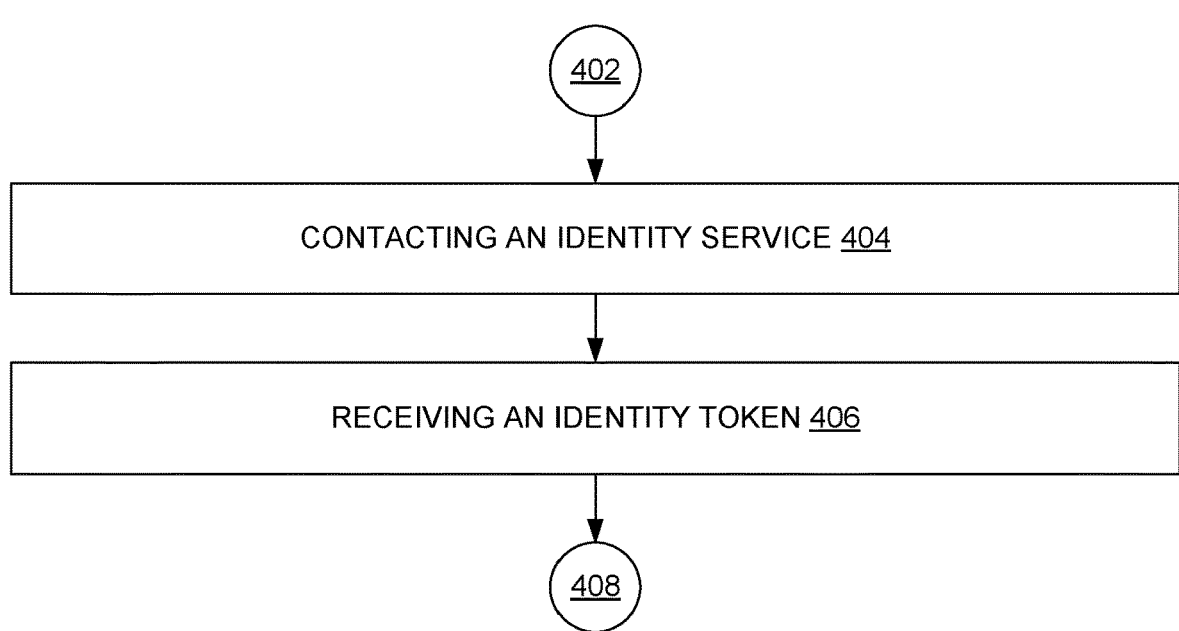
FIG. 4

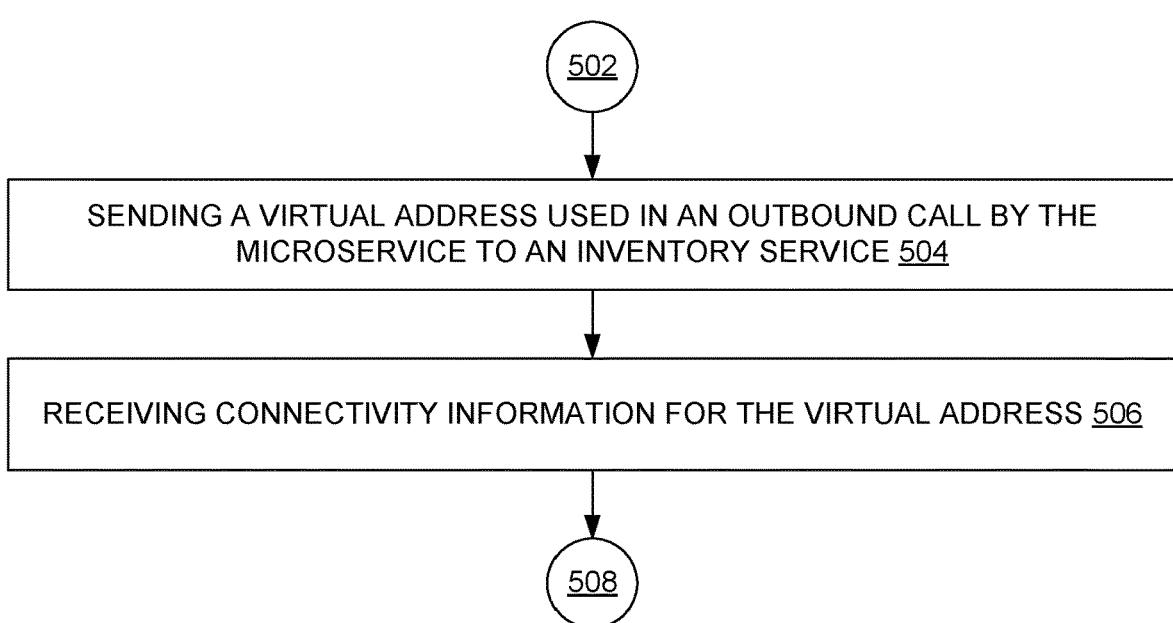
FIG. 5

600
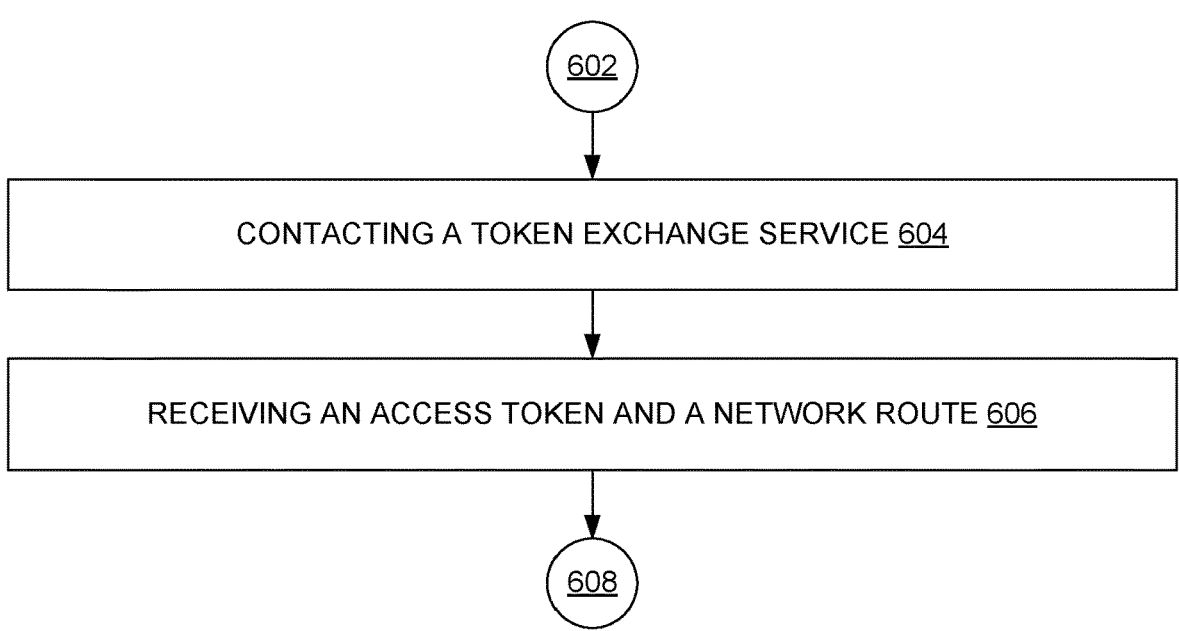
(602)
CONTACTING A TOKEN EXCHANGE SERVICE 604
RECEIVING AN ACCESS TOKEN AND A NETWORK ROUTE 606
(608)
FIG. 6

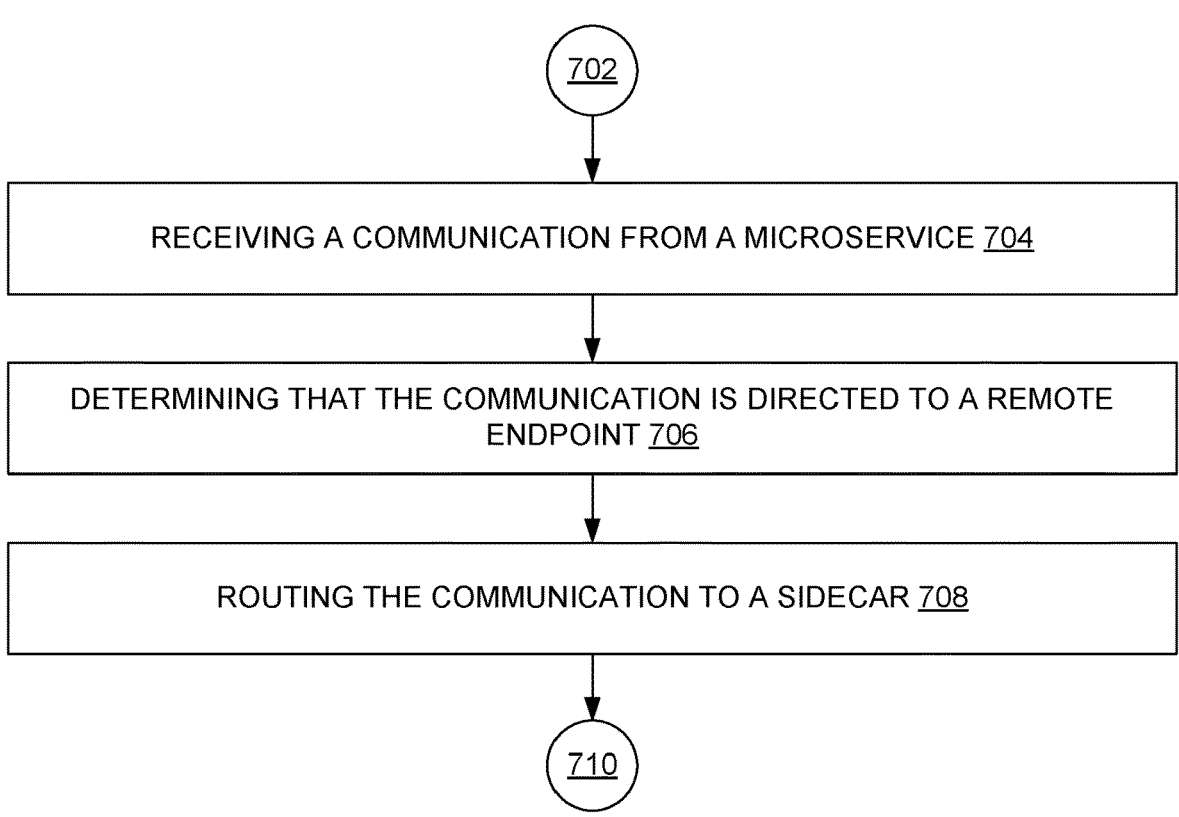
RECEIVING A COMMUNICATION FROM A MICROSERVICE 704
DETERMINING THAT THE COMMUNICATION IS DIRECTED TO A REMOTE ENDPOINT 706
ROUTING THE COMMUNICATION TO A SIDECAR 708
FIG. 7

Figure 8:
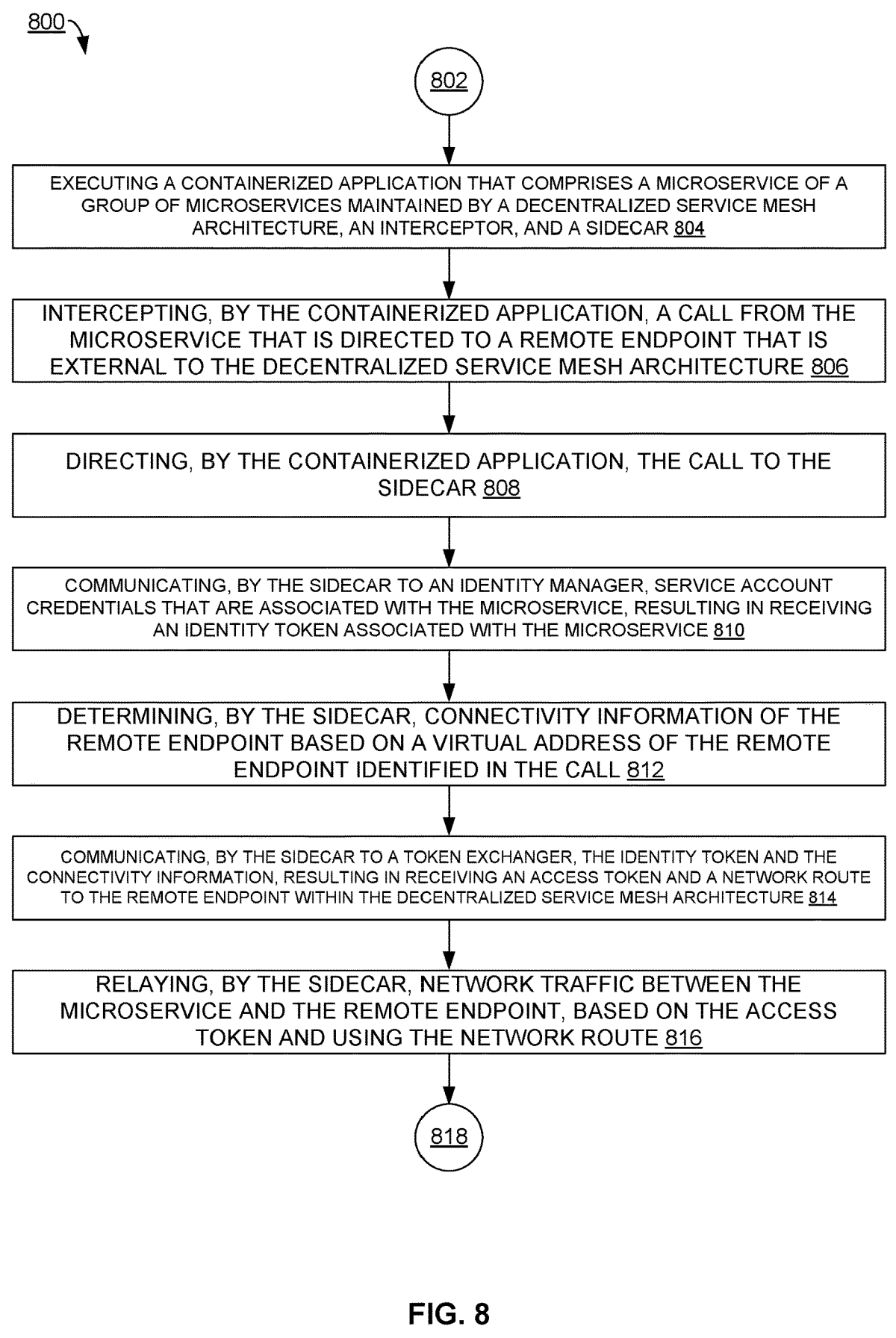

800

( 802 )

EXECUTING A CONTAINERIZED APPLICATION THAT COMPRISES A MICROSERVICE OF A GROUP OF MICROSERVICES MAINTAINED BY A DECENTRALIZED SERVICE MESH ARCHITECTURE, AN INTERCEPTOR, AND A SIDECAR 804

INTERCEPTING, BY THE CONTAINERIZED APPLICATION, A CALL FROM THE MICROSERVICE THAT IS DIRECTED TO A REMOTE ENDPOINT THAT IS EXTERNAL TO THE DECENTRALIZED SERVICE MESH ARCHITECTURE 806

DIRECTING, BY THE CONTAINERIZED APPLICATION, THE CALL TO THE SIDECAR 808

COMMUNICATING, BY THE SIDECAR TO AN IDENTITY MANAGER, SERVICE ACCOUNT CREDENTIALS THAT ARE ASSOCIATED WITH THE MICROSERVICE, RESULTING IN RECEIVING AN IDENTITY TOKEN ASSOCIATED WITH THE MICROSERVICE 810

DETERMINING, BY THE SIDECAR, CONNECTIVITY INFORMATION OF THE REMOTE ENDPOINT BASED ON A VIRTUAL ADDRESS OF THE REMOTE ENDPOINT IDENTIFIED IN THE CALL 812

COMMUNICATING, BY THE SIDECAR TO A TOKEN EXCHANGER, THE IDENTITY TOKEN AND THE CONNECTIVITY INFORMATION, RESULTING IN RECEIVING AN ACCESS TOKEN AND A NETWORK ROUTE TO THE REMOTE ENDPOINT WITHIN THE DECENTRALIZED SERVICE MESH ARCHITECTURE 814

RELAYING, BY THE SIDECAR, NETWORK TRAFFIC BETWEEN THE MICROSERVICE AND THE REMOTE ENDPOINT, BASED ON THE ACCESS TOKEN AND USING THE NETWORK ROUTE 816

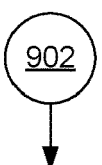

902

REDIRECTING, BY A CONTAINERIZED APPLICATION IN A SERVICE MESH THAT COMPRISES A GROUP OF MICROSERVICES OF A SYSTEM COMPRISING AT LEAST ONE PROCESSOR, A CALL FROM A CONTAINER OF THE A OF CONTAINERS THAT EXECUTES WITHIN THE CONTAINERIZED APPLICATION, WHEREIN THE CALL IS DIRECTED TO A REMOTE ENDPOINT THAT IS EXTERNAL TO THE SERVICE MESH, AND WHEREIN THE CONTAINERIZED APPLICATION REDIRECTS THE CALL TO A SIDECAR OF THE CONTAINERIZED APPLICATION 904

SENDING, BY THE SIDECAR TO AN IDENTITY MANAGER OF THE SERVICE MESH, SERVICE ACCOUNT CREDENTIALS THAT ARE ASSOCIATED WITH THE MICROSERVICE, RESULTING IN RECEIVING AN IDENTITY TOKEN ASSOCIATED WITH THE MICROSERVICE 906

DETERMINING, BY THE SIDECAR, CONNECTIVITY INFORMATION OF THE REMOTE ENDPOINT BASED ON A VIRTUAL ADDRESS OF THE REMOTE ENDPOINT IDENTIFIED IN THE CALL 908

SENDING, BY THE SIDECAR TO A TOKEN EXCHANGE MANAGER, THE IDENTITY TOKEN AND THE CONNECTIVITY INFORMATION, RESULTING IN RECEIVING AN ACCESS TOKEN AND A NETWORK ROUTE TO THE REMOTE ENDPOINT WITHIN THE SERVICE MESH 910

RELAYING, BY THE SIDECAR, NETWORK TRAFFIC BETWEEN THE MICROSERVICE AND THE REMOTE ENDPOINT, BASED ON THE IDENTITY TOKEN AND USING THE NETWORK ROUTE 912

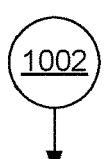

1002

REDIRECTING A CALL FROM A MICROSERVICE OF A SERVICE MESH, WHEREIN THE CALL IS DIRECTED TO A REMOTE ENDPOINT THAT IS EXTERNAL TO THE SERVICE MESH, AND WHEREIN THE CALL IS REDIRECTED TO A SIDECAR THAT IS ASSOCIATED WITH THE MICROSERVICE 1004

PROVIDING, BY THE SIDECAR TO AN IDENTITY MANAGER OF THE SERVICE MESH, SERVICE ACCOUNT CREDENTIALS THAT ARE ASSOCIATED WITH THE MICROSERVICE, RESULTING IN RECEIVING AN IDENTITY TOKEN ASSOCIATED WITH THE MICROSERVICE 1006

DETERMINING, BY THE SIDECAR, CONNECTIVITY INFORMATION OF THE REMOTE ENDPOINT BASED ON A VIRTUAL ADDRESS OF THE REMOTE ENDPOINT IDENTIFIED IN THE CALL 1008

PROVIDING, BY THE SIDECAR TO A TOKEN EXCHANGE MANAGER, THE IDENTITY TOKEN AND THE CONNECTIVITY INFORMATION, RESULTING IN RECEIVING AN ACCESS TOKEN AND A NETWORK ROUTE TO THE REMOTE ENDPOINT WITHIN THE SERVICE MESH 1010

RELAYING, BY THE SIDECAR, NETWORK TRAFFIC BETWEEN THE MICROSERVICE AND THE REMOTE ENDPOINT, BASED ON THE ACCESS TOKEN AND USING THE NETWORK ROUTE 1012

TRANSPARENT, ON-DEMAND ROUTE DETERMINATION AND DELEGATED AUTHORIZATION IN A LARGE-SCALE, DECENTRALIZED SERVICE MESH

BACKGROUND

A group of microservices can execute within a service mesh to collectively provide a computer service.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can execute a containerized application that comprises a microservice of a group of microservices maintained by a decentralized service mesh architecture, and a sidecar. The system can intercept, by the containerized application, a call from the microservice that is directed to a remote endpoint that is external to the decentralized service mesh architecture. The system can direct, by the containerized application, the call to the sidecar. The system can communicate, by the sidecar to an identity manager, service account credentials that are associated with the microservice, resulting in receiving an identity token associated with the microservice. The system can determine, by the sidecar, connectivity information of the remote endpoint based on a virtual address of the remote endpoint identified in the call. The system can communicate, by the sidecar to a token exchanger, the identity token and the connectivity information, resulting in receiving an access token and a network route to the remote endpoint within the decentralized service mesh architecture. The system can relay, by the sidecar, network traffic between the microservice and the remote endpoint, based on the access token and using the network route.

An example method can comprise redirecting, by a containerized application in a service mesh that comprises a group of microservices of a system comprising at least one processor, a call from a container of the containers that executes within the containerized application, wherein the call is directed to a remote endpoint that is external to the service mesh, and wherein the containerized application redirects the call to a sidecar of the containerized application. The method can further comprise sending, by the sidecar to an identity manager of the service mesh, service account credentials that are associated with the microservice, resulting in receiving an identity token associated with the microservice. The method can further comprise determining, by the sidecar, connectivity information of the remote endpoint based on a virtual address of the remote endpoint identified in the call. The method can further comprise sending, by the sidecar to a token exchange manager, the identity token and the connectivity information, resulting in receiving an access token and a network route to the remote endpoint within the service mesh. The method can further comprise relaying, by the sidecar, network traffic between the microservice and the remote endpoint, based on the identity token and using the network route.

An example non-transitory computer-readable medium can comprise instructions that, in response to execution, cause a system comprising a processor to perform operations. These operations can comprise redirecting, by containerized application in a service mesh, a call from a microservice of the containerized application, wherein the call is directed to a remote endpoint that is external to the service mesh, and wherein the containerized application redirects the call to a sidecar that is associated with the microservice. These operations can further comprise providing, by the sidecar to an identity manager of the service mesh, service account credentials that are associated with the microservice, resulting in receiving an identity token associated with the microservice. These operations can further comprise determining, by the sidecar, connectivity information of the remote endpoint based on a virtual address of the remote endpoint identified in the call. These operations can further comprise providing, by the sidecar to a token exchange manager, the identity token and the connectivity information, resulting in receiving an access token and a network route to the remote endpoint within the service mesh. These operations can further comprise relaying, by the sidecar, network traffic between the microservice and the remote endpoint, based on the access token and using the network route.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 2 illustrates another example system architecture that can facilitate on-demand route determination and delegated authorization in a decentralized service mesh, in accordance with an embodiment of this disclosure;

FIG. 3 illustrates an example process flow for a sidecar component, and that can facilitate on-demand route determination and delegated authorization in a decentralized service mesh, in accordance with an embodiment of this disclosure;

FIG. 4 illustrates an example process flow for a sidecar component communicating with an identity component, and that can facilitate on-demand route determination and delegated authorization in a decentralized service mesh, in accordance with an embodiment of this disclosure;

FIG. 5 illustrates another example process flow for a sidecar component communicating with an inventory component, and that can facilitate on-demand route determination and delegated authorization in a decentralized service mesh, in accordance with an embodiment of this disclosure;

FIG. 6 illustrates another example process flow for a sidecar component communicating with a token exchange component, and that can facilitate on-demand route determination and delegated authorization in a decentralized service mesh, in accordance with an embodiment of this disclosure;

FIG. 7 illustrates another example process flow for a containerized application, and that can facilitate on-demand route determination and delegated authorization in a decentralized service mesh, in accordance with an embodiment of this disclosure;

FIG. 8 illustrates an example process flow that can facilitate on-demand route determination and delegated authorization in a decentralized service mesh, in accordance with an embodiment of this disclosure;

FIG. 9 illustrates another example process flow that can facilitate on-demand route determination and delegated authorization in a decentralized service mesh, in accordance with an embodiment of this disclosure;

FIG. 10 illustrates another example process flow that can facilitate on-demand route determination and delegated authorization in a decentralized service mesh, in accordance with an embodiment of this disclosure;

DETAILED DESCRIPTION

Overview

Figure 1:
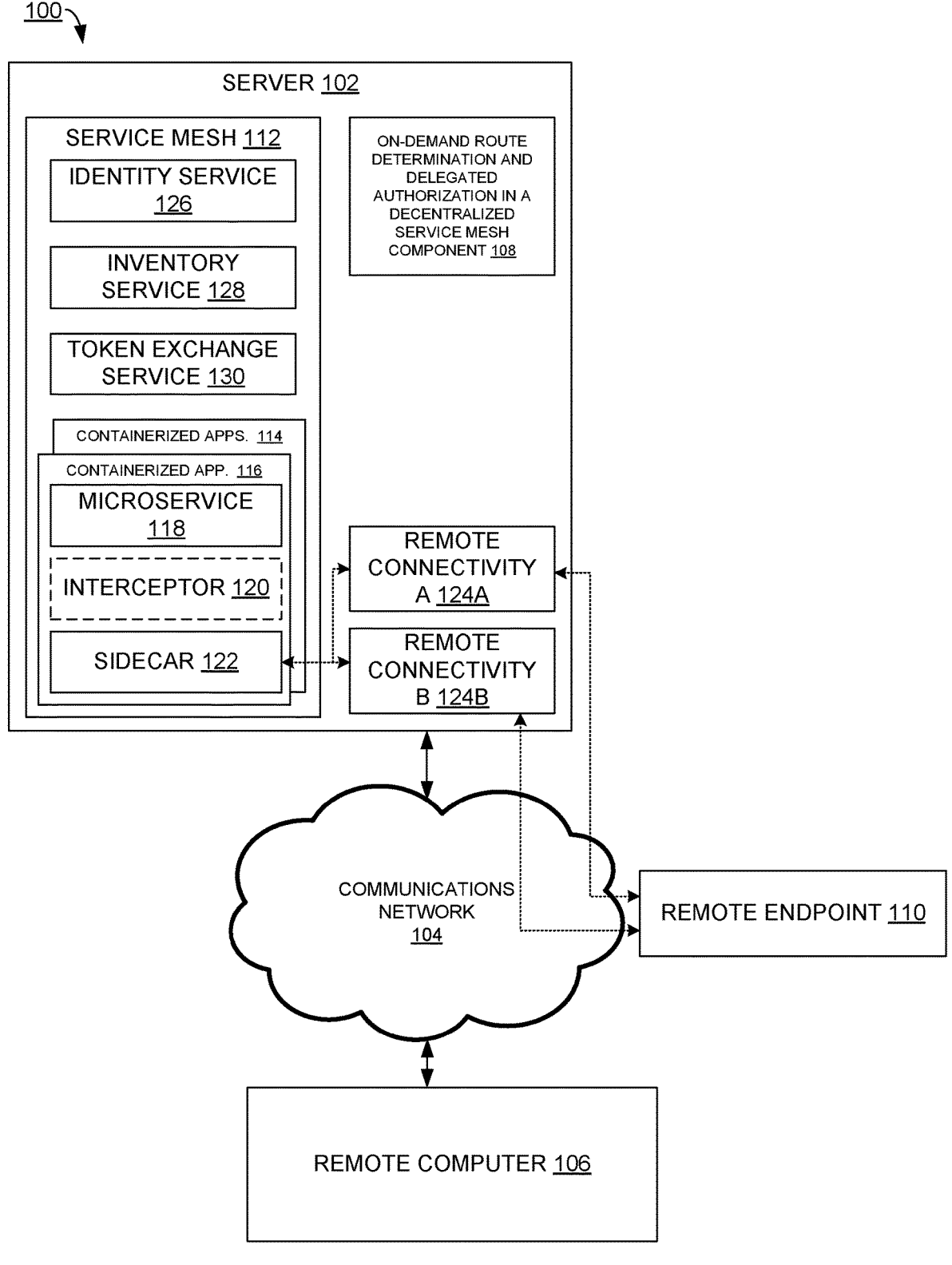
FIG. 1 illustrates an example system architecture that can facilitate on-demand route determination and delegated authorization in a decentralized service mesh, in accordance with an embodiment of this disclosure.

There can be scenarios that involve a decentralized service mesh running in a cloud computing environment. That is, control and management plane functions can be distributed across multiple nodes, rather than implemented a centralized control plane. Networking and communication features can be distributed among the participating nodes, enabling autonomy and resilience in the network infrastructure. The same service mesh can be extended using secure communication approaches, which can facilitate routing to globally distributed appliances or applications (which can be referred to as endpoints).

In a complex, distributed network architecture such as this, satisfying security and networking requirements can be a challenge for any service that communicates with one of any globally distributed endpoints. It can be that authorization checks must be in place to ensure that all traffic only reaches the endpoints that the source is explicitly allowed to communicate with. In order to be performant, these checks can be enforced without requiring awareness of all globally distributed endpoints. In some examples, using a fine-grained, restrictive access model can be implemented when operating at this scale.

In such an architecture, the route that traffic can take can be dynamic, depending on multiple factors, such as:

Is the endpoint reachable? For globally distributed endpoints using the internet as a transport medium, it can be that 100% availability is not possible.

Which communication mechanism is available?

Which enabling service of that communication mechanism is available? This can be determined at runtime by the data center with an active always-on connection or a closest server for an on-demand session.

Which instance of that enabling service is available for use? That is, which always-on aggregator and client pair should be used, or which instance and port the on-demand session can be reached on?

Thus, a networking architecture of this type can be described as a large-scale, decentralized service mesh that incorporates some features from a network overlay (for example, dynamic route determination and authorization). Implementing this authorization enforcement and on-demand route determination can pose significant challenges for applications intending to use this networking architecture to communicate with remote endpoints. An example remote endpoint can comprise a management application programming interface (API) for a compute or storage product deployed to a customer network or co-location facility. Another example remote endpoint can comprise a software product deployed to a customer network or public cloud.

In some examples, the present techniques can be implemented as follows. In a scenario where all outbound calls from a cloud-based service are intercepted and redirected to a sidecar service, the responsibility for authorization and route determination can be transparently delegated to that service. This approach can separate the authorization decision from the enforcement, and can allow the authorization decision to take place outside of the service mesh. Route determination can also to be performed on demand based on a currently available route to the remote endpoint.

For a microservices platform, consider a service (service A) running in a containerized application that needs to communicate with a remote endpoint. An approach can be to run an "initialization container" and sidecar container in the same containerized application as this service. The initialization container can be executed and run to completion before all other containers are brought online. An initialization container can be responsible for updating the network configuration of that containerized application to intercept and redirect outbound traffic to a port on the sidecar container.

Another approach can be to use a Container Network Interface Plugin to perform the network configuration.

The sidecar container can comprise a long-running process that can live alongside all other containers in that containerized application.

When service A makes an outbound call, a look up can be performed based on metadata to retrieve the virtual address of the endpoint(s) it needs to reach. Within the platform, a list of virtual addresses can be stored as unique identifiers in an endpoint inventory service. Following this, the outbound call can be made in the same manner as if the remote endpoint was on the same network as service A. It can be that no additional network configuration or authorization integration needs to be performed by the requesting service.

Next, the containerized application networking configuration can intercept and redirect the outbound call to a port on the sidecar container. This sidecar container can inherit an identity of service A through the use of a service account assigned to the containerized application. This enables the sidecar to perform authentication and authorization checks on the service's behalf.

At this stage, the sidecar container can inspect the original destination of the outbound call and retrieve the virtual address used by service A. Given the intended destination and inherited identity of the service (through a service account), the sidecar can perform on-demand authorization and route determination based on the communication mechanism available to the intended endpoint.

In some examples, the following steps can be sequentially-executed by the sidecar:

1. Service account credentials can be authenticated at an identity component to generate an access token to be used in all subsequent requests.

2. A virtual address used in the outbound call can be used to lookup connectivity details in the endpoint inventory service.

3. A request can then be made with the Token Exchange Service (TES) to retrieve a token that allows outbound connectivity, as well as the route to be used. As part of this request, an authorization check can be performed within TES to ensure the requesting service is authorized to communicate with the given endpoint.

4. Traffic can then be relayed to and from the requested endpoint using the appropriate communication mechanism.

Implementing the present techniques can offer the following benefits:

1. Route determination can be performed on demand. It can be that the route and communication mechanism by which traffic is sent is not a concern of the requesting service.
2. The authorization mechanism can be decoupled from the service mesh. That is, the authorization mechanism can be maintained and managed completely separately to the service mesh.
3. There can be transparent and secure connectivity, with no code changes required in a requesting service.
4. Existing network interfaces can be used untouched.
5. It can be that requesting services do not need to integrate with proprietary application programming interfaces (APIs) for trust establishment.
6. Allows a platform granular trust controls
7. Endpoint Inventory and Token Exchange Services can be leveraged for endpoint registration and controls.
8. Policy decisions for connectivity can be separated from policy enforcement (in line with Zero Trust policies).
9. A service mesh can transparently support multiple secure connectivity mechanisms.
10. Services communicating with remote endpoints without directly integrating with secure communication mechanisms."
11. Services communicating with remote endpoints are abstracted from the platform on which they are running."

Prior approaches lack the benefits of the present techniques. For example, there are prior techniques that facilitate devices to establish a secure, bi-directional communication channel with a platform. There are prior techniques that facilitate secure and private communication between devices and a platform. There are prior techniques that facilitate a secure, lightweight, cloud-native communication mechanism to provide an always-on connection to remote endpoints. There are prior techniques that facilitate a secure communication mechanism to allow an on-demand connection to remote endpoints.

There are prior techniques that facilitate a container orchestration platform on which software-as-a-service (SaaS) related products and offers are provided and maintained. There are prior techniques that facilitate sidecars that offer interception and redirection techniques. However, these prior-technique sidecars are used to establish the traditional features of a service mesh, such as traffic management, load balancing, service discovery, and observability.

In contrast to these prior approaches, the present techniques differ from prior approaches to authentication and authorization using sidecar patterns in service meshes. In some examples, the present techniques can be implemented in a service mesh that houses control place mechanisms and business logic within a central hub (running across multiple data centers). This service mesh can reside within a private network(s), and inter-service communication within this service mesh can be handled.

However, a network architecture according to the present techniques can differ from prior approaches in how business logic applications communicate with globally distributed devices (e.g., storage, servers, or software-based devices). According to the present techniques this communication can be facilitated by a secure connectivity mechanism that establishes an encrypted and secure tunnel from the central hub's private network to each remote device.

In contrast to prior approaches, the present techniques can be implemented to move from a standard service mesh to large-scale, decentralized service mesh through extending the mesh with these underlying secure connectivity mechanisms. Applications housed in a private network of the central hub can now transparently reach globally distributed remote devices, each located within its own private network, but reachable via the available secure connectivity mechanism.

It can be that prior approaches lack the dynamic routing, authentication and authorization via the available tunneling mechanism of the present techniques. As such, it can be that it is not possible to communicate with the remote devices directly using prior approaches.

The present techniques can extend beyond standard capabilities of a service mesh by providing multiple alternate authorization capabilities depending on a secure connectivity solution that is used to reach a given device.

The present techniques can be implemented to facilitate applications within a central hub to securely communicate with globally distributed remote devices as if they were directly connected.

Example Architectures

FIG. 1 illustrates an example system architecture 100 that can facilitate on-demand route determination and delegated authorization in a decentralized service mesh, in accordance with an embodiment of this disclosure.

System architecture 100 comprises server 102, communications network 104, remote computer 106, and remote endpoint 110. In turn, server 102 comprises on-demand route determination and delegated authorization in a decentralized service mesh component 108, service mesh 112, containerized applications 114, containerized application 116 (which comprises microservice 118, interceptor 120, and sidecar 122), remote connectivity A 124A, remote connectivity B 124B, identity service 126, inventory service 128, and token exchange service 130.

Figure 11:
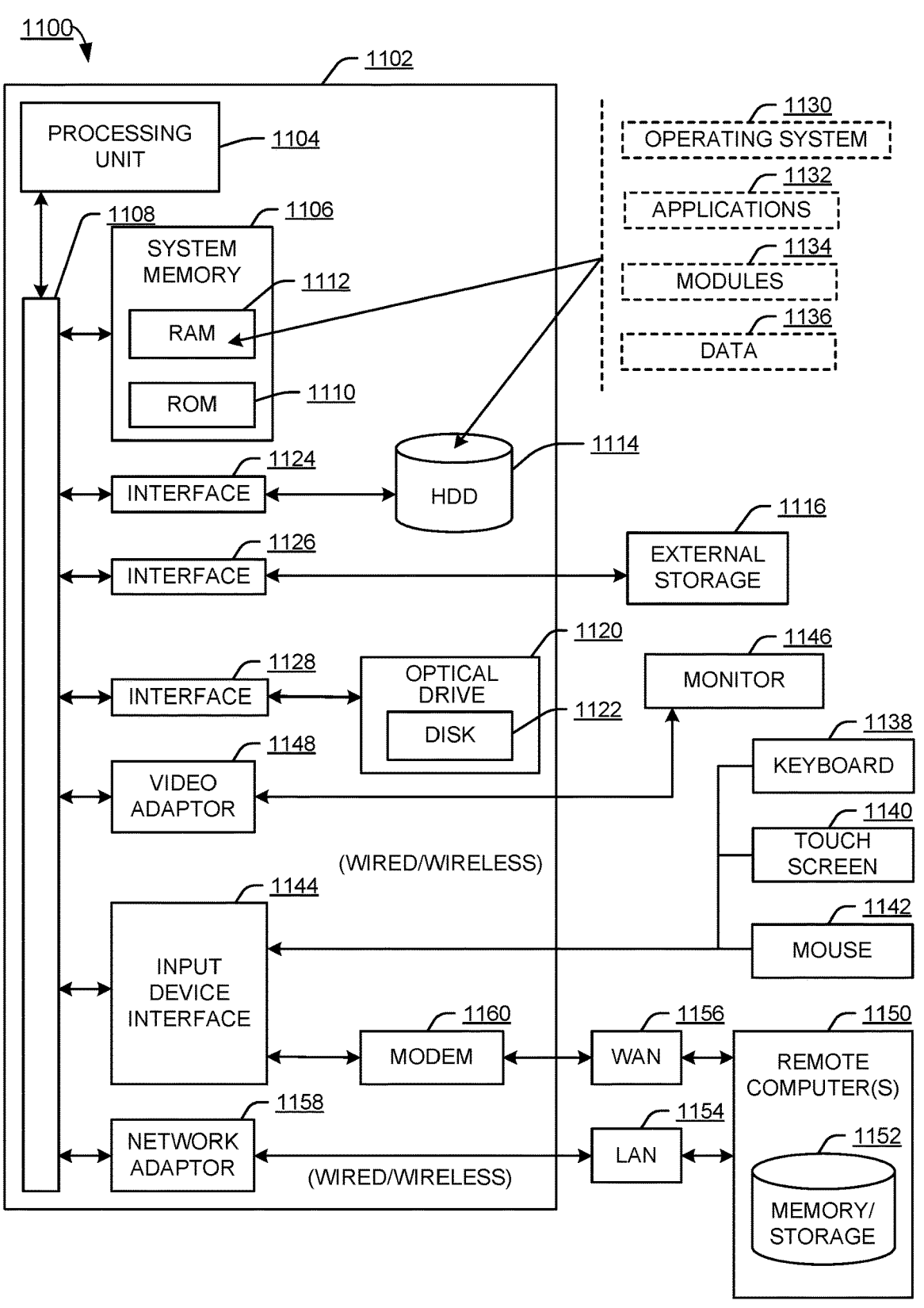
FIG. 11 illustrates an example block diagram of a computer operable to execute an embodiment of this disclosure.

Each of server 102, remote computer 106, and/or remote endpoint 110 can be implemented with part(s) of computing environment 1100 of FIG. 11. Communications network 104 can comprise a computer communications network, such as the Internet.

Server 102 can host a computer service that is implemented with a microservice architecture, and which can be accessed and/or invoked by remote computer 106 via communications network 104. A microservice of containerized applications 114 and/or microservice 118 can access remote endpoint 110 as part of implementing the computer service, and this access can include performing authentication and/or identity management services.

Service mesh 112 can generally comprise an infrastructure layer for inter-microservice communications between microservices of containerized applications 114 and containerized application 116 (e.g., microservice 118). Microservice 118 can generally comprise computer-executable code that is configured to perform a specific task, as well as to interact with other microservices (as part of implementing a computer service) via a protocol.

Containerized application 116 generally comprises a group of containers that have shared storage and network resources, where each of microservice 118 and sidecar 122 execute within separate containers within containerized application 116. In some examples, containerized application 116 can comprise a dedicated session of resources. In some examples, containerized applications 114 comprises multiple instances of a containerized application, which can each be similar to containerized application 116.

Interceptor 120 generally is configured to monitor communications to and from microservice 118, and to route communications that involve accessing a remote endpoint (e.g., remote endpoint 110) to sidecar 122. In some examples, interceptor 120 can be initialized and executed before microservice 118 and sidecar 122. Interceptor 120 can be spun up, set a network configuration of containerized application 116 to handle communications with a remote endpoint via sidecar 122. After this is complete, interceptor 120 can be shut down and microservice 118 and sidecar 122 can be started.

Sidecar 122 can generally be configured to handle identity, authorization, and routing to remote endpoint 110 on behalf of microservice 118.

Remote connectivity 124A and remote connectivity 124B can each comprise a secure connectivity mechanism that can be used by microservice 118 to access remote endpoint 110. In some examples, remote connectivity 124A and remote connectivity 124B implement different remote connectivity protocols, have different network routing to microservice 118 within service mesh 112, and it can be that they are not always active (so that an on-demand routing to an available connectivity mechanism can be made at the time of a request by microservice 118 to access remote endpoint 110).

Identity service 126 can be configured to provide access tokens for microservices of containerized applications 114 and microservice 118. Inventory service 128 can be configured to identify remote endpoints for microservices of containerized applications 114 and microservice 118. Token exchange service 130 can be configured to provide connectivity tokens for microservices of containerized applications 114 and microservice 118.

In some examples, on-demand route determination and delegated authorization in a decentralized service mesh component 108 can implement part(s) of the process flows of FIGS. 3-10 to implement on-demand route determination and delegated authorization in a decentralized service mesh.

It can be appreciated that system architecture 100 is one example system architecture for on-demand route determination and delegated authorization in a decentralized service mesh, and that there can be other system architectures that facilitate on-demand route determination and delegated authorization in a decentralized service mesh.

FIG. 2 illustrates another example system architecture that can facilitate on-demand route determination and delegated authorization in a decentralized service mesh, in accordance with an embodiment of this disclosure. In some examples, part(s) of system architecture 200 can be implemented by part(s) of system architecture 100 of FIG. 1 to facilitate on-demand route determination and delegated authorization in a decentralized service mesh.

System architecture 200 comprises platform 202 (which can be similar to server 102 of FIG. 1), remote location 204 (which can be a physical location separate from a physical location of platform 202), remote endpoint 210 (which can be similar to remote endpoint 110), and secure connectivity mechanism 224 (which can be similar to remote connectivity A 124A and/or remote connectivity B 124B).

In turn, platform 202 comprises containerized application 216 (which comprises microservice 218, interceptor 220, and sidecar 222), identity service 226, inventory service 228, and token exchange service 230. These parts of system architecture 200 can be similar to containerized application 116 (which comprises microservice 118, interceptor 120, and sidecar 122), identity service 126, inventory service 128, and token exchange service 130 of FIG. 1, respectively.

As part of facilitating microservice 218 accessing remote endpoint 210, sidecar 222 can first contact identity service 226 to receive an identity token. Second, sidecar 222 can contact inventory service 228 to look up associated data for accessing remote endpoint 210. Third, sidecar 222 can contact token exchange service 320 to receive an authorization token and an associated network route within platform 202 to secure connectivity mechanism 224.

Example Process Flows

FIG. 3 illustrates an example process flow 300 for a sidecar component, and that can facilitate on-demand route determination and delegated authorization in a decentralized service mesh, in accordance with an embodiment of this disclosure. In some examples, one or more embodiments of process flow 300 can be implemented by sidecar 122 of FIG. 1, sidecar 222 of FIG. 2, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 300 begins with 302, and moves to operation 304.

Operation 304 depicts authenticating service account credentials at an identity component to generate an identity token to be used in subsequent requests. Using the example of FIG. 1, this can comprise sidecar 122 contacting identity service 126, and can be prompted by microservice 118 making a call to remote endpoint 110 that is intercepted containerized application 116, and redirected to sidecar 122.

After operation 304, process flow 300 moves to operation 306.

Operation 306 depicts using a virtual address in the outbound call to lookup connectivity details in an endpoint inventory service. Continuing with the example of FIG. 1, this can comprise, after completing operation 304 to obtain an access token, sidecar 122 contacting inventory service 128 for the connectivity details.

After operation 306, process flow 300 moves to operation 308.

Operation 308 depicts requesting, from a token exchange service, to retrieve a token that allows outbound connectivity, as well as the route to be used. As part of this request, an authorization check can be performed within token exchange service to ensure the requesting service is authorized to communicate with the given endpoint. Continuing with the example of FIG. 1, this can comprise, after completing operation 306 to obtain the connectivity details, sidecar 122 contacting token exchange service 130 for the token, as well as the route information.

After operation 308, process flow 300 moves to operation 310.

Operation 310 depicts relaying traffic between the microservice and the requested endpoint using the appropriate communication mechanism. Continuing with the example of FIG. 1, this can comprise sidecar 122 relaying traffic between microservice 118 and remote endpoint 110 using the information obtained in operations 304-308.

After operation 310, process flow 300 moves to 312, where process flow 300 ends.

FIG. 4 illustrates an example process flow 400 for a sidecar component communicating with an identity component, and that can facilitate on-demand route determination and delegated authorization in a decentralized service mesh, in accordance with an embodiment of this disclosure. In some examples, one or more embodiments of process flow 400 can be implemented by sidecar 122 of FIG. 1, sidecar 222 of FIG. 2, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 300 of FIG. 3, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts sending service account credentials to an identity service. Using the example of FIG. 1, this can comprise sidecar 122 providing service account credentials associated with microservice 118 to identity service 126, and can be prompted by microservice 118 making a call to remote endpoint 110 that is intercepted by interceptor 120, and redirected to sidecar 122.

After operation 404, process flow 400 moves to operation 406.

Operation 406 depicts receiving an identity token. Continuing with the example of FIG. 1, this can be an identity token that is associated with microservice 118, and can be used by sidecar 122 to implement the present techniques.

After operation 406, process flow 400 moves to 408, where process flow 400 ends.

FIG. 5 illustrates another example process flow 500 for a sidecar component communicating with an inventory component, and that can facilitate on-demand route determination and delegated authorization in a decentralized service mesh, in accordance with an embodiment of this disclosure. In some examples, one or more embodiments of process flow 500 can be implemented by sidecar 122 of FIG. 1, sidecar 222 of FIG. 2, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 300 of FIG. 3, process flow 400 of FIG. 4, process flow 600 of FIG. 6, process flow 700 of FIG. 7, process flow 800 of FIG. 8, process flow 900 of FIG. 9, and/or process flow 1000 of FIG. 10.

Process flow 500 begins with 502, and moves to operation 504.

Operation 504 depicts sending a virtual address used in an outbound call by the microservice to an inventory service. Using the example of FIG. 1, microservice 118 can make an outbound call to remote endpoint 110, which can be redirected to sidecar 122. Sidecar 122 can identify a virtual address used in the call and send this information to inventory service 128.

After operation 504, process flow 500 moves to operation 506.

Operation 506 depicts receiving connectivity information for the virtual address. Continuing with the example of FIG. 1, this can comprise sidecar 122 receiving the connectivity information from inventory service 128.

FIG. 6 illustrates another example process flow 600 for a sidecar component communicating with a token exchange component, and that can facilitate on-demand route determination and delegated authorization in a decentralized service mesh, in accordance with an embodiment of this disclosure. In some examples, one or more embodiments of process flow 600 can be implemented by sidecar 122 of FIG. 1, sidecar 222 of FIG. 2, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 300 of FIG. 3, process flow 400 of FIG. 4, process flow 500 of FIG. 5, process flow 700 of FIG. 7, process flow 800 of FIG. 8, process flow 900 of FIG. 9, and/or process flow 1000 of FIG. 10.

Process flow 600 begins with 602, and moves to operation 604.

Operation 604 depicts contacting a token exchange service. Using the example of FIG. 1, sidecar 122 can contact token exchange service 130 to retrieve an access token and a network route to use for accessing remote endpoint 110.

After operation 604, process flow 600 moves to operation 606.

Operation 606 comprises receiving an access token and a network route. Continuing with the example of FIG. 1, this can comprise token exchange service 130 performing an authorization check on sidecar 122 based on the request of operation 604. Where this authorization check succeeds, token exchange service 130 can send—and sidecar 122 can receive—an access token and network route information.

After operation 606, process flow 600 moves to 608, where process flow 600 ends.

FIG. 7 illustrates another example process flow 700 for an interceptor component, and that can facilitate on-demand route determination and delegated authorization in a decentralized service mesh, in accordance with an embodiment of this disclosure. In some examples, one or more embodiments of process flow 700 can be implemented by containerized application 116 of FIG. 1, containerized application 216 of FIG. 2, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 300 of FIG. 3, process flow 400 of FIG. 4, process flow 500 of FIG. 5, process flow 600 of FIG. 6, process flow 800 of FIG. 8, process flow 900 of FIG. 9, and/or process flow 1000 of FIG. 10.

Process flow 700 begins with 702, and moves to operation 704.

Operation 704 depicts receiving a communication from a microservice. Using the example of FIG. 1, this can comprise containerized application 116 intercepting a communication from microservice 118 that is directed to an entity other than containerized application 116.

After operation 704, process flow 700 moves to operation 706.

Operation 706 depicts determining that the communication is directed to a remote endpoint. Continuing with the example of FIG. 1, this can comprise containerized application 116 determining that the communication is directed to an entity outside of server 102 and service mesh 112 (such as remote endpoint 110), such as by analyzing the communication for a destination that it identifies.

Operation 708 depicts routing the communication to a sidecar. Continuing with the example of FIG. 7, this can comprise containerized application 116 routing the communication to sidecar 122. Sidecar 122 can then transparently handle authorization and routing for the communication on behalf of microservice 118.

After operation 708, process flow 700 moves to 710, where process flow 700 ends.

FIG. 8 illustrates an example process flow 800 that can facilitate on-demand route determination and delegated authorization in a decentralized service mesh, in accordance with an embodiment of this disclosure. In some examples, one or more embodiments of process flow 800 can be implemented by on-demand route determination and delegated authorization in a decentralized service mesh component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts executing a containerized application that comprises a microservice of a group of microservices maintained by a decentralized service mesh architecture, and a sidecar. In some examples, the containerized application can be similar to containerized application 116 of FIG. 1, the decentralized service mesh architecture can be similar to service mesh 112, and the sidecar can be similar to sidecar 122.

In some examples, the containerized application further comprises an initialization container that is configured to update a network configuration of the containerized application to intercept and redirect outbound traffic of the microservice to a port of the sidecar, before executing the microservice and the sidecar in the containerized application. That is, a containerized application can run an initialization container and a sidecar container in the same containerized application. An initialization container can be executed and run to completion before all other containers are brought online. The initialization container can be responsible for updating the network configuration of that containerized application to intercept and redirect outbound traffic to a port on the sidecar container.

After operation 804, process flow 800 moves to operation 806.

Operation 806 depicts intercepting, by the containerized application, a call from the microservice that is directed to a remote endpoint that is external to the decentralized service mesh architecture. Using the example of FIG. 1, this can comprise containerized application 116 intercepting a call from microservice 118 that is directed to remote endpoint 110.

After operation 806, process flow 800 moves to operation 808.

Operation 808 depicts directing, by the containerized application, the call to the sidecar. Continuing with the example of FIG. 1, this can comprise containerized application 116 the token exchanger having determined directing the call from operation 806 to sidecar 122.

After operation 808, process flow 800 moves to operation 810.

Operation 810 depicts communicating, by the sidecar to an identity manager, service account credentials that are associated with the microservice, resulting in receiving an identity token associated with the microservice. Continuing with the example of FIG. 1, this can comprise sidecar 122 communicating with identity service 126.

After operation 810, process flow 800 moves to operation 812.

Operation 812 depicts determining, by the sidecar, connectivity information of the remote endpoint based on a virtual address of the remote endpoint identified in the call. Continuing with the example of FIG. 1, this can comprise sidecar 122 communicating with inventory service 128.

In some examples, operation 812 comprises determining the connectivity information based on the sidecar communicating the virtual address to an endpoint inventory, resulting in receiving the connectivity information. That is, a virtual address used in the outbound call can be used to look up connectivity details in an endpoint inventory service.

In some examples, operation 812 comprises determining the connectivity information based on metadata associated with the call. For example, when a service A makes an outbound call, a look up can be performed based on meta data to retrieve the virtual address of the endpoint(s) it wants to reach.

After operation 812, process flow 800 moves to operation 814.

Operation 814 depicts communicating, by the sidecar to a token exchanger, the identity token and the connectivity information, resulting in receiving an access token and a network route to the remote endpoint within the decentralized service mesh architecture. Continuing with the example of FIG. 1, this can comprise sidecar 122 communicating with token exchange service 130.

In some examples, the decentralized service mesh architecture comprises the containerized application, and wherein the identity manager and the token exchanger operate outside of the decentralized service mesh architecture. That is, using the example of FIG. 1, server 102 can comprise service mesh 112, identity service 126, and token exchange service 130. Containerized application 116 can execute within service mesh 112, while identity service 126 and token exchange service 130 can execute outside of service mesh 112.

In some examples, operation 814 comprises receiving the access token and the network route based on the token exchanger having determined that the access token indicates authorization to access the remote endpoint. That is, a request can be made with a token exchange service to retrieve a token that allows outbound connectivity, as well the route to be used. As part of this request, an authorization check can be performed within the token exchange service to ensure the requesting service is authorized to communicate with the given endpoint.

In some examples, the token exchanger determines the network route after the sidecar communicates the identity token and the connectivity information to the token exchanger. That is, determination can be performed on demand. This can be where route and communication mechanism by which traffic will be sent is not a concern of the requesting service.

In some examples, the access token and route information are returned as part of the same call, e.g., the token exchange service receives a request with an identity token and remote endpoint identifier. The response to this request can comprise both an access token and route information.

After operation 814, process flow 800 moves to operation 816.

Operation 816 depicts relaying, by the sidecar, network traffic between the microservice and the remote endpoint, based on the access token and using the network route. Continuing with the example of FIG. 1, this can comprise sidecar 122 relaying traffic sent between microservice 118 and remote endpoint 110.

After operation 816, process flow 800 moves to 818, where process flow 800 ends.

FIG. 9 illustrates another example process flow 900 that can facilitate on-demand route determination and delegated authorization in a decentralized service mesh, in accordance with an embodiment of this disclosure. In some examples, one or more embodiments of process flow 900 can be implemented by on-demand route determination and delegated authorization in a decentralized service mesh component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts redirecting, by a containerized application in a service mesh that comprises a group of microservices of a system comprising at least one processor, a call from a container of the containers that executes within the containerized application, wherein the call is directed to a remote endpoint that is external to the service mesh, and wherein the containerized application redirects the call to a sidecar of the containerized application. In some examples, operation 904 can be implemented in a similar manner as operations 804-808 of FIG. 8.

After operation 904, process flow 900 moves to operation 906.

Operation 906 depicts sending, by the sidecar to an identity manager of the service mesh, service account credentials that are associated with the microservice, resulting in receiving an identity token associated with the microservice. In some examples, operation 906 can be implemented in a similar manner as operation 810 of FIG. 8.

In some examples, a service account is associated with the containerized application, wherein the service account identifies the microservice, and the sidecar is associated with an identity of the microservice based on the service account to perform authentication and authorization checks on behalf of the microservice. That is, a sidecar container can inherit the identity of a service A through the use of a service account assigned to the containerized application. This can facilitate the sidecar in performing authentication and authorization checks on service A's behalf.

A service account can comprise some information (e.g., credentials or a service account token), that can be exchanged with an identity management service for an identity token. A service account can be used to generate an identity token. This can comprise an authentication check. The identity token can prove the identity of the holder. The identity token can be used in an access token request for a specific endpoint. This can comprise an authorization check, and can be performed based on the identity token and the endpoint specified in the request. It can be that only an authorized user would be issued an access token, which can be used to communicate with the provided endpoint.

After operation 906, process flow 900 moves to operation 908.

Operation 908 depicts determining, by the sidecar, connectivity information of the remote endpoint based on a virtual address of the remote endpoint identified in the call. In some examples, operation 908 can be implemented in a similar manner as operation 812 of FIG. 8.

In some examples, operation 908 comprises determining the connectivity information based on the sidecar sending the virtual address to an endpoint inventory, and wherein the endpoint inventory stores respective unique identifiers associated with respective virtual addresses that comprise the virtual address. That is, within server 102 of FIG. 1, a list of virtual addresses would be stored as unique identifiers in inventory service 128.

In some examples, the connectivity information identifies a communication protocol, and wherein relaying the network traffic between the microservice and the remote endpoint, based on the access token and using the network route comprises relaying the network traffic according to the communication protocol. That is, given the intended destination and inherited identity of the service (through a service account), the sidecar can perform on-demand authorization and route determination based on the communication mechanism available to the intended endpoint.

After operation 908, process flow 900 moves to operation 910.

Operation 910 depicts sending, by the sidecar to a token exchange manager, the identity token and the connectivity information, resulting in receiving an access token and a network route to the remote endpoint within the service mesh. In some examples, operation 910 can be implemented in a similar manner as operation 814 of FIG. 8.

In some examples, the access token indicates that the sidecar is authorized to communicate with the remote endpoint. In some examples, the access token indicates that the sidecar is authorized to access outbound connectivity from the service mesh. In some examples, the access token indicates that the sidecar is authorized to access the network route.

That is, a request can be made with a token exchange service to retrieve a token that allows outbound connectivity as well as the route to be used. As part of this request, an authorization check can be performed within the token exchange service to ensure the requesting service is authorized to communicate with the given endpoint.

It can be that requesting an access token includes specifying the endpoint that is to be reached. This can then be enforced when the outbound request is made.

After operation 910, process flow 900 moves to operation 912.

Operation 912 depicts relaying, by the sidecar, network traffic between the microservice and the remote endpoint, based on the identity token and using the network route. In some examples, operation 912 can be implemented in a similar manner as operation 816 of FIG. 8.

After operation 912, process flow 900 moves to 914, where process flow 900 ends.

FIG. 10 illustrates another example process flow 1000 that can facilitate on-demand route determination and delegated authorization in a decentralized service mesh, in accordance with an embodiment of this disclosure. In some examples, one or more embodiments of process flow 1000 can be implemented by on-demand route determination and delegated authorization in a decentralized service mesh component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts redirecting, by containerized application in a service mesh, a call from a microservice of the containerized application, wherein the call is directed to a remote endpoint that is external to the service mesh, and wherein the containerized application redirects the call to a sidecar that is associated with the microservice. In some examples, operation 1004 can be implemented in a similar manner as operations 804-808 of FIG. 8.

In some examples, the microservice and the sidecar execute within the containerized application.

In some examples, the containerized application comprises a group of containers, the microservice executes in at least one container of the group of containers that comprises a first container, and the sidecar executes within a second container of the group of containers. That is, the microservice and the sidecar can execute within different containers in a containerized application.

After operation 1004, process flow 1000 moves to operation 1006.

Operation 1006 depicts providing, by the sidecar to an identity manager of the service mesh, service account credentials that are associated with the microservice, resulting in receiving an identity token associated with the microservice. In some examples, operation 1006 can be implemented in a similar manner as operation 810 of FIG. 8.

After operation 1006, process flow 1000 moves to operation 1008.

Operation 1008 depicts determining, by the sidecar, connectivity information of the remote endpoint based on a virtual address of the remote endpoint identified in the call. In some examples, operation 1008 can be implemented in a similar manner as operation 812 of FIG. 8.

In some examples, operation 1008 comprises determining the connectivity information based on the sidecar providing the virtual address to an endpoint inventory, resulting in receiving the connectivity information. That is, a virtual address used in the outbound can would be used to look up the required connectivity details in the endpoint inventory service.

After operation 1008, process flow 1000 moves to operation 1010.

Operation 1010 depicts providing, by the sidecar to a token exchange manager, the identity token and the connectivity information, resulting in receiving an access token and a network route to the remote endpoint within the service mesh. In some examples, operation 1010 can be implemented in a similar manner as operation 814 of FIG. 8.

In some examples, receiving the access token and the network route to the remote endpoint within the service mesh comprises receiving the access token and the network route based on the token exchange manager determining that the access token indicates authorization to access the remote endpoint.

In some examples, the token exchange manager determines the network route after the sidecar provides the identity token and the connectivity information to the token exchange manager. That is determination can be performed on demand, and it can be that a route and communication mechanism by which traffic will be sent is not a concern of the requesting service.

After operation 1010, process flow 1000 moves to operation 1012.

Operation 1012 depicts relaying, by the sidecar, network traffic between the microservice and the remote endpoint, based on the access token and using the network route. In some examples, operation 1012 can be implemented in a similar manner as operation 816 of FIG. 8.

After operation 1012, process flow 1000 moves to 1014, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102, remote computer 106, and/or remote endpoint 110.

In some examples, computing environment 1100 can implement one or more embodiments of the process flows of FIGS. 3-10 to facilitate on-demand route determination and delegated authorization in a decentralized service mesh.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component." "module," "system," "interface," "cluster." "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

executing a containerized application that comprises a microservice of a group of microservices maintained by a decentralized service mesh architecture, and a sidecar;

intercepting, by the containerized application, a call from the microservice that is directed to a remote endpoint that is external to the decentralized service mesh architecture;

directing, by the containerized application, the call to the sidecar;

communicating, by the sidecar to an identity manager, service account credentials that are associated with the microservice, resulting in receiving an identity token associated with the microservice;

determining, by the sidecar, connectivity information of the remote endpoint based on a virtual address of the remote endpoint identified in the call;

communicating, by the sidecar to a token exchanger, the identity token and the connectivity information, resulting in receiving an access token that indicates that the microservice has authorization to access the remote endpoint and a determined network route to the remote endpoint within the decentralized service mesh architecture, wherein the determined network route is determined after the intercepting of the call; and relaying, by the sidecar, network traffic between the microservice and the remote endpoint using the determined network route, and based on the access token indicating that the microservice has the authorization to access the remote endpoint.

2. The system of claim 1, wherein the decentralized service mesh architecture comprises the containerized application, and wherein the identity manager and the token exchanger operate outside of the decentralized service mesh architecture.

3. The system of claim 1, wherein determining the connectivity information of the remote endpoint based on the virtual address of the remote endpoint identified in the call comprises determining the connectivity information based on the sidecar communicating the virtual address to an endpoint inventory, resulting in receiving the connectivity information.

4. The system of claim 1, wherein receiving the access token and the network route to the remote endpoint within the decentralized service mesh architecture comprises receiving the access token and the network route based on the token exchanger having determined that the access token indicates that the microservice has the authorization to access the remote endpoint.

5. The system of claim 1, wherein the token exchanger determines the network route after the sidecar communicates the identity token and the connectivity information to the token exchanger.

6. The system of claim 1, wherein the containerized application further comprises an initializer that is configured to update a network configuration of the containerized application to intercept and redirect outbound traffic of the microservice to a port of the sidecar, before executing the microservice and the sidecar in the containerized application.

7. The system of claim 1, wherein determining the connectivity information of the remote endpoint based on the virtual address of the remote endpoint identified in the call comprises determining the connectivity information based on metadata associated with the call.

8. A method, comprising:

redirecting, by a containerized application in a service mesh that comprises a group of microservices of a system comprising at least one processor, a call from a container of the containers that executes within the containerized application, wherein the call is directed to a remote endpoint that is external to the service mesh, and wherein the containerized application redirects the call to a sidecar of the containerized application;

sending, by the sidecar to an identity manager of the service mesh, service account credentials that are associated with the microservice, resulting in receiving an identity token associated with the microservice;

determining, by the sidecar, connectivity information of the remote endpoint based on a virtual address of the remote endpoint identified in the call;

sending, by the sidecar to a token exchange manager, the identity token and the connectivity information, resulting in receiving an access token that indicates that the microservice has authorization to access the remote endpoint and a network route to the remote endpoint within the service mesh, wherein the network route is determined after the intercepting of the call; and relaying, by the sidecar, network traffic between the microservice and the remote endpoint using the network route, and based on the access token indicating that the microservice has the authorization to access the remote endpoint.

9. The method of claim 8, wherein determining the connectivity information of the remote endpoint based on the virtual address of the remote endpoint identified in the call comprises determining the connectivity information based on the sidecar sending the virtual address to an endpoint inventory, and wherein the endpoint inventory stores respective unique identifiers associated with respective virtual addresses that comprise the virtual address.

10. The method of claim 8, wherein a service account is associated with the containerized application, wherein the service account identifies the microservice, and wherein the sidecar is associated with an identity of the microservice based on the service account to perform authentication and authorization checks on behalf of the microservice.

11. The method of claim 8, wherein the connectivity information identifies a communication protocol, and wherein relaying the network traffic between the microservice and the remote endpoint, based on the access token and using the network route comprises relaying the network traffic according to the communication protocol.

12. The method of claim 8, wherein the access token indicates that the sidecar is authorized to communicate with the remote endpoint.

13. The method of claim 8, wherein the access token indicates that the sidecar is authorized to access outbound connectivity from the service mesh.

14. The method of claim 8, wherein the access token indicates that the sidecar is authorized to access the network route.

15. A non-transitory computer-readable medium comprising instructions that, in response to execution, cause a system comprising at least one processor to perform operations, comprising:

redirecting, by containerized application in a service mesh, a call from a microservice of the containerized application, wherein the call is directed to a remote endpoint that is external to the service mesh, and wherein the containerized application redirects the call to a sidecar that is associated with the microservice;

providing, by the sidecar to an identity manager of the service mesh, service account credentials that are associated with the microservice, resulting in receiving an identity token associated with the microservice;

determining, by the sidecar, connectivity information of the remote endpoint based on a virtual address of the remote endpoint identified in the call;

providing, by the sidecar to a token exchange manager, the identity token and the connectivity information, resulting in receiving an access token that indicates that the microservice has authorization to access the remote endpoint and a dynamically-determined network route to the remote endpoint within the service mesh; and relaying, by the sidecar, network traffic between the microservice and the remote endpoint using the dynamically-determined network route, and based on the access token indicating that the microservice has the authorization to access the remote endpoint.

16. The non-transitory computer-readable medium of claim 15, wherein the microservice and the sidecar execute within the containerized application.

17. The non-transitory computer-readable medium of claim 16, wherein the containerized application comprises a group of containers, wherein the microservice executes in at least one container of the group of containers that comprises a first container, and wherein the sidecar executes within a second container of the group of containers.

18. The non-transitory computer-readable medium of claim 15, wherein determining the connectivity information of the remote endpoint based on the virtual address of the remote endpoint identified in the call comprises determining the connectivity information based on the sidecar providing the virtual address to an endpoint inventory, resulting in receiving the connectivity information.

19. The non-transitory computer-readable medium of claim 15, wherein receiving the access token and the network route to the remote endpoint within the service mesh comprises receiving the access token and the network route based on the token exchange manager determining that the access token indicates authorization to access the remote endpoint.

20. The non-transitory computer-readable medium of claim 15, wherein the token exchange manager determines the network route after the sidecar provides the identity token and the connectivity information to the token exchange manager.

* * * * *